United States Patent [19]

Clelland

[11] Patent Number: 5,069,497

[45] Date of Patent: Dec. 3, 1991

[54] PARCEL VAN DOOR

[75] Inventor: William F. Clelland, Columbia, Mo.

[73] Assignee: Ryder Truck Rental, Inc., Miami, Fla.

[21] Appl. No.: 651,196

[22] Filed: Feb. 6, 1991

[51] Int. Cl.$^5$ ............................................... B60J 5/06
[52] U.S. Cl. ...................................... 296/155; 49/426;
     49/497; 52/207; 296/24.1
[58] Field of Search .............. 296/155, 146, 190, 24.1;
     49/404, 409, 411, 426, 497; 52/206, 207;
     105/355

[56] References Cited

U.S. PATENT DOCUMENTS

| | | | |
|---|---|---|---|
| 2,677,571 | 5/1954 | Williams | 296/24.1 |
| 3,337,995 | 8/1967 | Taylor | 49/426 |
| 3,348,337 | 10/1967 | Grasso | 49/426 |
| 4,848,832 | 7/1989 | Starnes | 296/190 |
| 4,881,346 | 11/1989 | Block | 49/411 |

Primary Examiner—Robert R. Song
Attorney, Agent, or Firm—Laff, Whitesel, Conte & Saret

[57] ABSTRACT

A sliding parcel van door according to the present invention comprises a door panel, upper and lower tracks for supporting the door and permitting sliding movement thereof along a predefined path, and resilient seal members on first and second edges of the door. The door is disposed parallel to and a predetermined distance away from a supporting wall containing a passageway to be controlled by the door. The seal members are preferably resilient tubular members which extend from the door panel surface toward the supporting wall. A wedge-shaped jam is provided on each of the two vertical edges of the passageway facing the door. The supporting wall may have a wall treatment material, such as carpet or padding applied to the surface facing the door. A ridge on each jam extends forward of any wall treatment material. When the door is in its closed position, the wedge shaped jams engage and compress the tubular seal members, providing a force to hold the door in a secure, substantially nonvibrating position. A locking mechanism includes a door mounted retractable stop member for engaging two fixed stop members recessed in the lower door track.

10 Claims, 4 Drawing Sheets

PARCEL VAN DOOR

BACKGROUND OF THE INVENTION

This to internal doors for motor vehicles, and more particularly to doors permitting controlled access between compartments in a parcel van or similar vehicle.

A number of vehicles are now available for purchase or rent which provide a rear section for storage of cargo, and a front section for accommodation of passengers. The sections are typically separated by a "bulkhead" wall. It is generally desirable to provide a passageway in the bulkhead wall to permit access between the passenger section and the cargo section. Such access facilitates loading and unloading of the cargo section and permits passengers to conveniently retrieve, at appropriate times, items temporarily stored in the cargo section It is also desirable to provide a door to close the passageway in order to prevent migration of items from the cargo section into the passenger section and to minimize the exchange of climate-controlled air in the passenger section with the untreated air of the cargo section One type of door which has been used in parcel vans as an internal door is a "sliding door" disposed parallel to, and immediately adjacent, the bulkhead wall. The door is generally located on the passenger-section side of the bulkhead wall so that cargo does not interfere with the movement of the door.

Such prior-art doors suffer from several problems Even in their closed position, the prior-art internal doors are prone to vibration and rattle. The prior-art doors do not provide a good seal between the door panel and the bulkhead wall, thereby permitting substantial air exchange between the passenger section and the cargo section. These doors also permit infiltration of noise and dust from the cargo section into the passenger section and aggravate the difficulty of providing appropriate climate-control in the passenger section.

An additional problem is that the prior-art doors employ a locking mechanism which requires a mating strike or similar structure which protrudes into the passageway. Such protrusion can interfere with loading and unloading of the cargo area, and is therefore undesirable.

Another problem with prior-art doors is that they are typically located immediately adjacent the bulkhead wall. It is frequently desirable to apply a wall treatment material, such as carpet, foam, or padding, to the surfaces in the passenger section of the vehicle to reduce noise levels and improve passenger comfort. These functions of the wall treatment material inherently require that the material be relatively thick. Due to this thickness, the material may physically interfere with the operation of the door, or use of such wall treatment materials may be entirely precluded by the prior-art doors.

OBJECTS AND SUMMARY OF THE INVENTION

It is therefore an object of the present invention to provide a sliding internal door for a parcel van or similar vehicle which provides substantially rattle- and vibration-free operation in its closed position.

It is a further object of the present invention to provide a sliding internal door for a parcel van or similar vehicle which provides a tight seal to minimize air interchange between areas on either side of the door.

It is another object of the present invention to provide a sliding internal door for a parcel van or similar vehicle wherein the door provides a locking mechanism free of protrusions into a passageway served by the door.

It is yet another object of the present invention to provide a sliding internal door for a parcel van or similar vehicle which may be used With thick wall treatment materials.

A sliding parcel van door according to the present invention comprises a door panel, upper and lower tracks for supporting the door and permitting sliding movement thereof along a predefined path, and resilient seal members on first and second edges of the door. The door is disposed parallel to and a predetermined distance away from a supporting wall containing a passageway to be controlled by the door. The seal members ar preferably resilient tubular members which extend from the door panel surface toward the supporting wall. A wedge-shaped jam is provided on each of the two vertical edges of the passageway facing the door. The supporting wall may have wall treatment material, such as carpet or padding applied to the surface facing the door. A ridge on each jam extends forward of any wall treatment material. When the door is in its closed position, the wedge shaped jams engage and compress the tubular seal members, providing a force to hold the door in a secure, substantially non-vibrating position. The seals also minimize air exchange through the passageway when the door is closed. A locking mechanism defines at least two positions in which the door may be securely retained. The locking mechanism includes a door mounted retractable stop member for engaging at least two fixed stop members recessed in the lower door track. Because the fixed stop members are recessed, they do not interfere with use of the passageway when the door is in its open position.

BRIEF DESCRIPTION OF THE DRAWINGS

These and other features of this invention will be best understood by reference to the following detailed description of a preferred embodiment of the invention, taken in conjunction with the accompanying drawings, in which.

DETAILED DESCRIPTION OF THE PREFERRED EMBODIMENT

Figure 1:
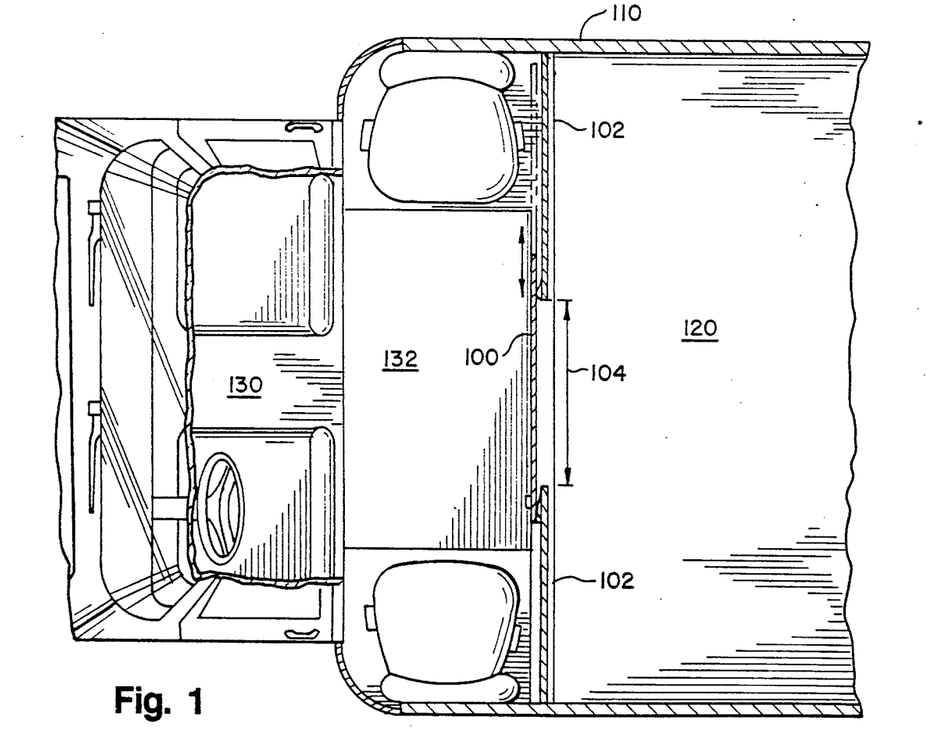
FIG. 1 is a top plan schematic view of a parcel van including an internal door according to the present invention.
Figure 2:
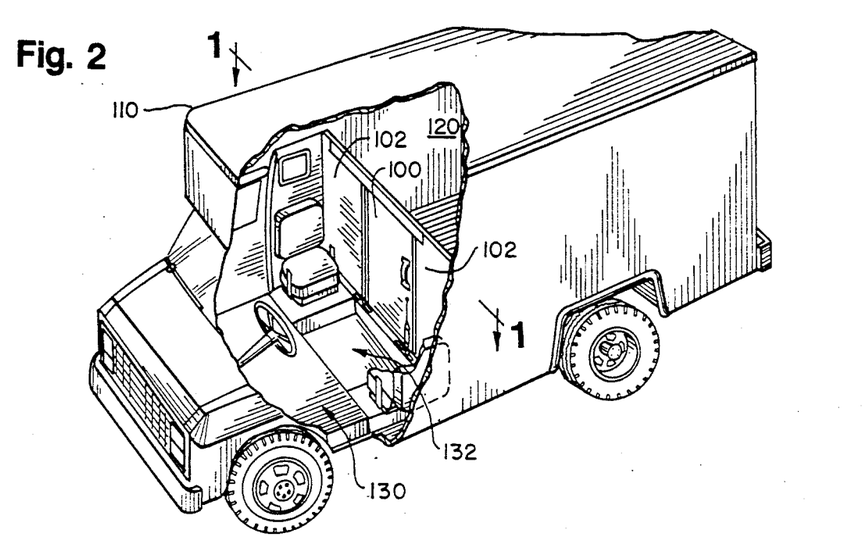
FIG. 2 is an oblique perspective view of the parcel van with portions of the cab broken away to reveal the internal door of FIG. 1.

Referring now to FIGS. 1-2, there is shown a parcel van 110 having a cargo section 120, a first passenger seating area 130, and a second passenger seating area 132. A bulkhead wall 102 separates the passenger seating areas 130, 132 from the cargo section 120. A passageway 104 provided in the bulkhead wall 102 permits van users to move, at appropriate times, between the cargo section 120 and the passenger seating areas 130, 132. A sliding internal door 100 according to the present invention is disposed parallel to, and substantially adjacent the bulkhead 19 wall 102.

Figure 4:
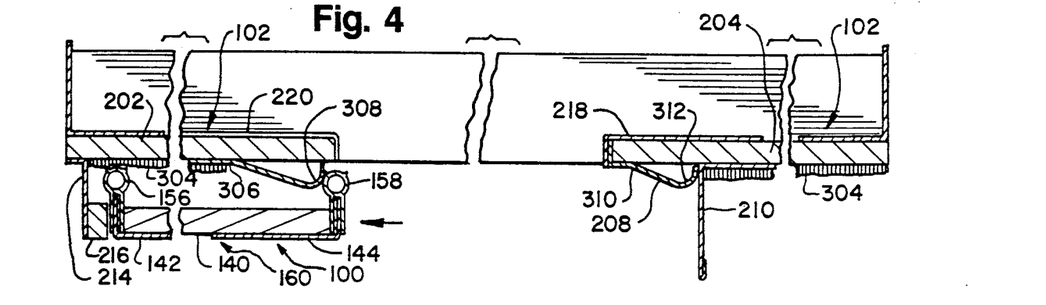
FIG. 4 is an enlarged top plan view of the parcel van door of FIGS. 1-3, showing the door in its "open" position.
Figure 5:
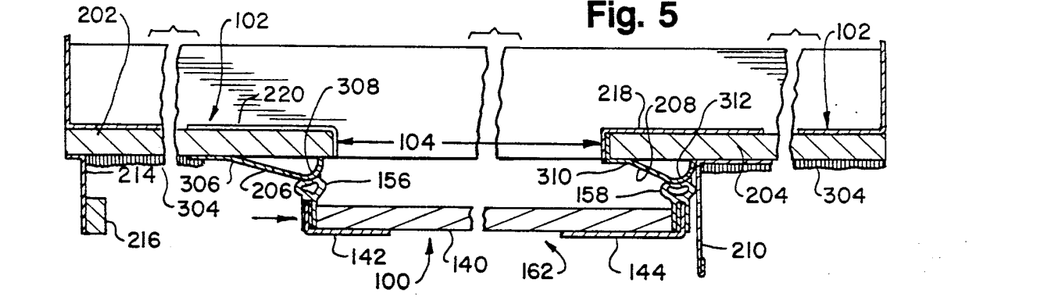
FIG. 5 is an enlarged top plan view of the parcel van door of FIGS. 1-4, showing the door in its "closed" position.

The door 100 may be selectably moved by van users into an open position 160 and a closed position 162 as best shown in FIGS. 4-5. In the open position, the door 100 is substantially clear of passageway 104 providing access therethrough. In the closed position, the door 100 blocks passageway 104 sufficiently well that objects may not travel from the cargo section 120 into the passenger seating areas 130, 132. Further, in the closed position, door 100 is sufficiently well sealed with respect to bulkhead wall 102 as to substantially reduce air exchange and noise propagation between the cargo section 120 and the passenger seating areas 130, 132.

Figure 3:
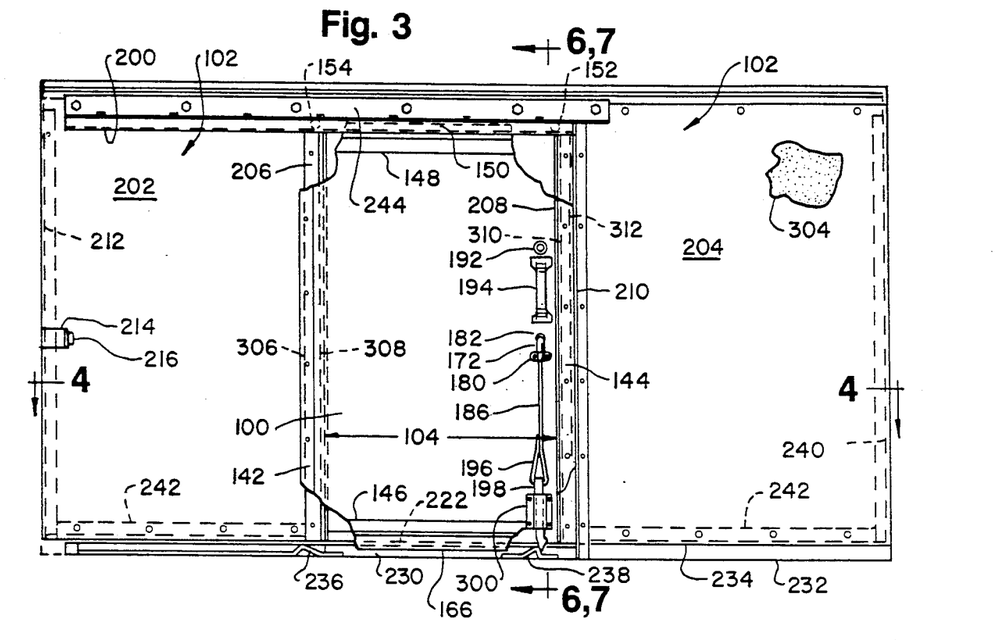
FIG. 3 is a front elevation view of a parcel van internal door according to the present invention with a portion of the door broken away to reveal a bulkhead wall.
Figure 6:
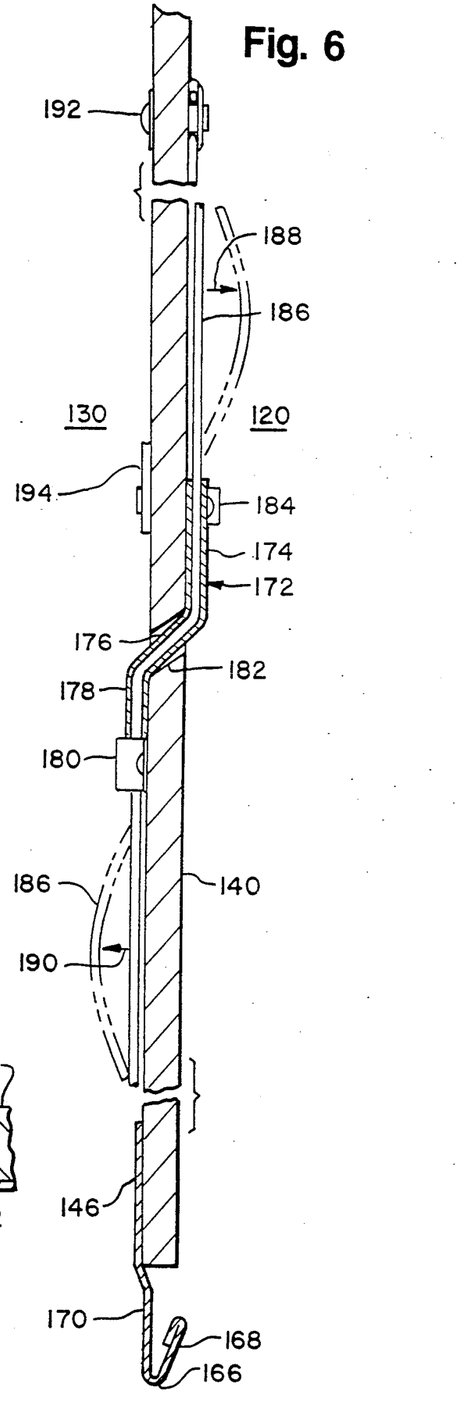
FIG. 6 is a side sectional view of the parcel van door taken along the section lines 6-6 of FIG. 3.
Figure 7:
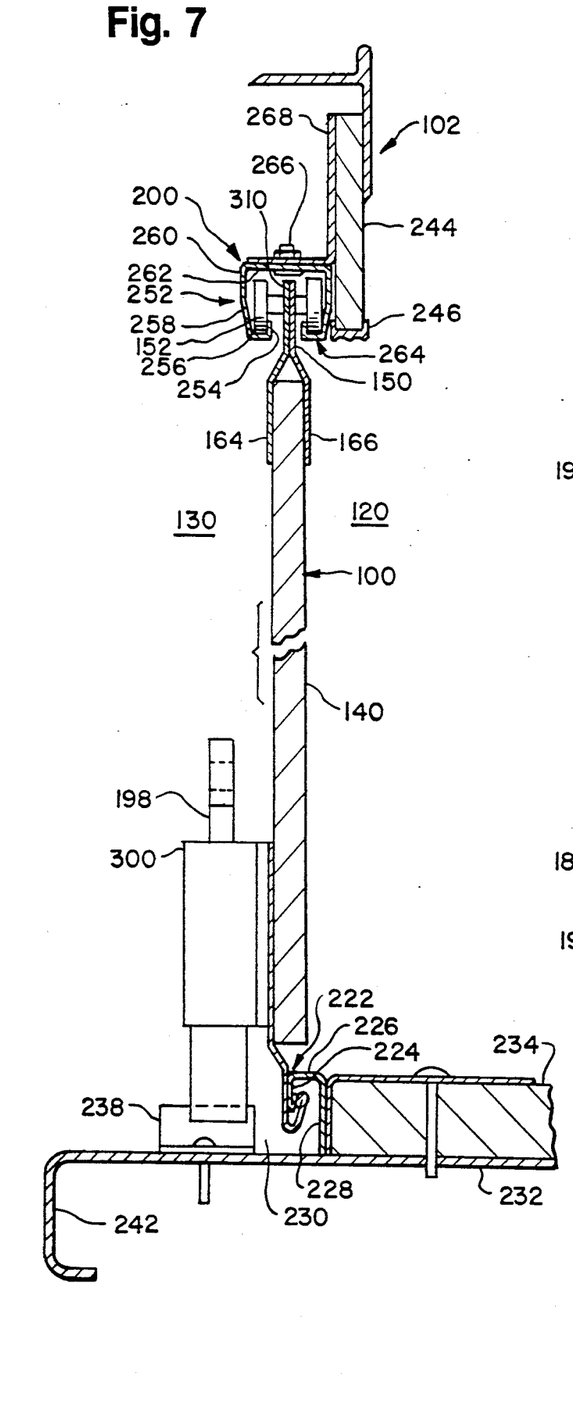
FIG. 7 is a side sectional view of the parcel van door taken along the section lines 7-7 of FIG. 3.

FIGS. 3, 6, and 7 show the construction and mounting of the door 100 according to the present invention. Referring now primarily to FIG. 3, the door 100 is mounted generally parallel to and adjacent the bulkhead wall not labelled in FIGS. 3-7. The bulkhead wall 102 comprises a left-hand portion 202, a right-hand portion 204, and a top or over-door portion 244. These bulkhead wall portions may be constructed of fiberglass-reinforced-plywood or another appropriate sheet material. The wall may be fabricated as a single piece of material or each of portions 202, 204, 244 may be individually fabricated. The left and right bulkhead wall portions 202, 204 are attached to the side walls or side posts (not shown) of the parcel van 110 using appropriate brackets 212, 240. For example, brackets 212, 240 may be constructed as angle brackets from steel or aluminum sheet or any other appropriate material. The wall portions 202, 204 are similarly attached to the floor and ceiling of the parcel van 110 using brackets 242 (ceiling brackets not shown). At least a substantial portion of the passenger compartment side of left and right-hand bulkhead wall portions 202, 204 is preferably covered with a soft wall treatment material 304, such as carpet, foam, or padding, in order to reduce noise levels and improve passenger comfort.

The bulkhead wall portions 202, 204, and 244 cooperate with the floor 234 of the parcel van to define a rectangular passageway 104 though which vehicle users (and cargo) may pass when the door 100 is in its open position.

The door 100 is mounted for slidable translation perpendicular to the long axis of the vehicle along an upper track 200 and a lower track 230, each of which are oriented parallel to the bulkhead wall 102. In other words, the door 100 is suspended between these upper and lower tracks 200, 230. As shown in FIG. 3, the upper and lower tracks 200, 230 extend along the ceiling (not shown) and floor 234 of the second passenger seating area 132 from a position near the left hand side wall attachment bracket 212 to a position just beyond the left end of the right-hand bulkhead wall portion 204. This permits door 100 to occupy a continuum of positions from a fully closed position 162 wherein the door 100 completely blocks the passageway 104, to a fully open position 160 wherein the door 100 is substantially clear of the passageway 104. While the door 100 is shown and described herein as opening to the left, the arrangement of tracks may be easily translated to provide for opening to the right instead.

A door stop bracket 214 supporting an appropriate flexible stop cushion 216 extends from the left-hand bulkhead wall portion 202 into the path of the door 100 at its left most extremity. The stop cushion 216 and bracket 214 prevent operation of the door 100 beyond the limits of upper and lower tracks 200, 230, preventing damage to the door and vehicle side wall (not shown) and preventing inadvertent removal of the door 100 from the tracks 200, 230.

Several components combine to form a frame around the edges of the bulkhead wall portions which define the passageway 104. At the right edge of the left-hand bulkhead wall portion 202, there is preferably installed a first door riser jam 206 extending from the top surface 234 to the upper track 200. A second door riser jam 208 is preferably installed at the left edge of the right-hand bulkhead wall portion 204, similarly extending from the top surface 234 to the upper track 200. Jams 206, 208 act as surfaces for engagement with mating sealing means provided on door 100. These sealing means will be discussed subsequently in greater detail. A right-hand door stop 210 is located adjacent the right edge 312 of jam 208 to prevent door travel past the right-most extremities of the upper and lower tracks 200, 230. Right-hand door stop 210 may be any appropriate stop means, such as right-angle bracket extending the length of the passageway 104, as shown in FIG. 3. Left and right trim brackets 220, 218 are preferably mounted on the rear surfaces of left and right bulkhead wall portions 202, 204 and include flanges to cover the inside passageway edges of wall portions 202, 204. A trim strip 246 (FIG. 7) is preferably installed at the bottom of the bulkhead wall over-door-portion 244 to promote a pleasing appearance The door 100 may be fabricated as a single panel 140 of any appropriate sturdy sheet material, such as fiberglass- reinforced plywood The door 146 includes upper, lower, right, and left edge strips 148, 146, 144, and 142 respectively. The edge strips protect the edges of the door 100 and promote a pleasant appearance. In addition, the upper and lower edge strips 148, 146 provide a facility for mounting appropriate means for attaching the door to the upper and lower tracks 200, 230. The right and left edge strips 144, 142 provide a means for mounting sealing means 156, 158 (FIGS. 4-5), as discussed subsequently in greater detail. A door pull handle 194 (FIG. 3) is preferably installed on the front side of the door.

The door 100 has an upper extension 150, which, when the door is installed, protrudes into upper track 200. Rollers 152, 154 are mounted for rotation on extension 150 and engage portions of track 200 to provide relatively friction free travel along the track. The door 100 has a lower extension 166, which, when the 18 door is installed protrudes into and engages portions of lower track 230.

Details of the construction of the upper track 200 and upper door extension 150 are most clearly shown in FIG. 7. An upper track support bracket 268 is attached to the bulkhead wall over-door-portion 244 and left-hand portion 202 at a height slightly above the top of passageway 104. Bracket 268 may be an angle bracket extending approximately the length of upper track 200. The upper track 200 itself is preferably constructed as a modified-C-shaped channel having at least one substantially flat upper surface 262 for attachment to the upper track support bracket 268 via conventional fasteners 266. A front channel portion 252 has a vertical section 260 descending perpendicularly from the flat surface 262, an angled section 258 sloping inward toward the center of the track 200, a bottom flat surface 256, and an inner lip 254. A rear channel portion 264 is symmetrically constructed The upper door extension 150 has a modified inverted-Y cross section including a front face portion 164 and a rear face portion 166. The front and rear face portions 164 and 166 are spaced apart and straddle the uppermost portion of the door 100. Angled sections of portions 164, 166 extend upward to meet, forming a vertical planar portion 310. Rollers 152, 154 (FIGS. 3, 7) are mounted in pairs on either side of vertical planar portion 310 for rotation on appropriate bearings (not shown). The rollers 152, 154 ride on the bottom flat surfaces 256 of front and rear channel portions 252, 264 to provide low-friction operation of door 100 along upper track 200. Inner lips 254 capture rollers 152, 154 to prevent forces normal to the door surface from dislodging the rollers from the upper track 200.

Details of the construction of the lower track 230 and lower door extension 166 are most clearly shown in FIGS. 3, 6, and 7. The lower track 230 is defined by a channel inlaid in the floor and extending parallel to, but spaced forward of, bulkhead wall 102. Accordingly, the lower track 230 extends vertically from the upper floor surface 234 to the lower floor surface 232. A lower door track assembly 222 (FIG. 7) comprises an attachment bracket portion 228 and an inverted-J-shaped capture rail 226 having a front lip 224. The attachment bracket portion 228 is conventionally attached to the upper floor surface 234. The capture rail 226 and lip 224 cooperate to engage with a mating lower extension 166 descending from the lower edge strip 146 at the bottom of door 100. The lower extension 166 generally has the form of a V-shaped channel having a front wall 170 and a rear wall 168. The rear wall 168 and the front lip 224 of capture rail 226 engage to permit longitudinal sliding movement with respect to one another while preventing vertical or transverse movement. This engagement allows the door 100 to slide freely along the lower track 230 while remaining captured therein.

The door 100 preferably includes a locking mechanism to releasably hold it in at least a predefined open position 160, and a predefined closed position 162. Lower track 230 has a first stop member 236 (FIG. 3) and a second stop member 238 (FIGS. 3 and 7) for engaging a stop means 198 on door 100 to retain the door in predetermined open and closed positions 160, 162 respectively. The stop means 198 is retractable by a user to permit the door to be moved to a different position. The stop means 198, which may be a bolt, rod, or other sturdy structural piece is preferably mounted for vertical sliding movement in a retaining bracket 300 at the bottom of door 100 on its front side. Thus, the stop means 198 is aligned with lower track 230 so that it may, when desired, engage stop members 236 or 238 (FIG. 3) which are located within the track. Because the stop members 236, 238 are recessed within the track 230, they do not protrude into or otherwise interfere with use of the passage way 104.

A finger pull 196 (FIG. 3) is attached to the stop means 198 to a user located on the front side of the door 100 to retract the stop. A cable 186 (FIG. 3 and 6) is preferably attached to the finger pull 196 and extends through an aperture 182 to the rear side of the door 100 to allow a user located on the rear side of the door to retract the stop means 198. A cable sheath tube 172 (FIG. 6) constructed of a sturdy material runs from one side of the door, through the aperture 182, to the opposite side of the door, and protects the cable and the door material from wear due to rubbing of the cable against the door material. Each end of sheath tube 172 is preferably affixed to the door panel 140 using appropriate tube clamps or brackets 180, 184.

Sheath tube 172 is preferably constructed incorporating only relatively gentle bends and avoiding right angles. For example, as shown in FIG. 6, sheath tube 172 may have a front section 178 which runs parallel to door panel 140, an gently angled section 176 running through the aperture 182, and a rear section 174 which also runs parallel to the door panel 140. The cable 186 is preferably attached to the door panel 140 on its rear side using a conventional fastener 192. Thus, a user located on the rear side of the door 100 may retract stop means 198 by pulling on cable 186 in the direction shown by arrow 188.

Figure 4A:
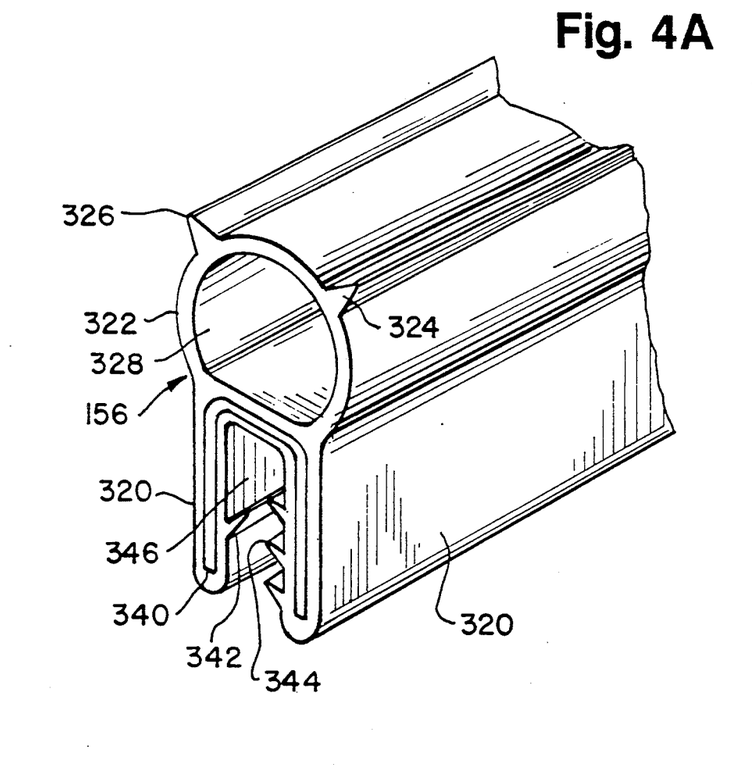
FIG. 4A is an enlarged perspective view of a door seal for 2 the parcel van door of FIGS. 1-4, showing an end of the seal.

The construction and operation of the door seal means 156, 158 is shown most clearly in FIGS. 4, 4A, and 5. Each door seal means 156, 158 forms resilient seal extending vertically along the entire length of the right-hand or left-hand edge of door panel 140. The seal means 156, 158, shown in cross section in FIG. 4A, has a pair of spaced attachment flanges 320, a compressible, substantially tubular sealing bead 322 forming an open region 328 therein, and first and second retaining nubs 324, 26. The seal means 156, 158 may be constructed from rubber, vinyl or any appropriate resilient material. Tubular bead 322 extends beyond the rearmost surface of the door panel 140.

The attachment flanges 320 ar disposed perpendicular to the plane of the door and are spaced apart a small distance to define an interior space 346 for receiving a portion of left or right door edge strips 142, 144 (FIGS. 3, 4, 5). Accordingly, each seal means 156, 158 may be secured to the door panel 140 by sandwiching one of the attachment flanges 320 between the side edge of the door panel 140 and the appropriate one of right or left door edge strips 142, 144. A stiffening member 340 (FIG. A) is preferably provided in seal means 156, 158 to control the space between the attachment flanges 320 and to urge the flanges 320 into secure frictional engagement with the door edge strips 142, 144. The stiffening member 340 may be constructed of any appropriate stiff, resilient material, such as spring steel. The stiffening member may have any appropriate shape, such as the rectangular U-shaped cross-section shown in FIG. 4A. The attachment flanges 320 preferably have one or more longitudinal ridges 342, 344 which protrude into the interior space 346. The ridges 342, 344 preferably increase the frictional engagement between the attachment flanges 320 and the door edge strips 142, 144. This prevents the seal means 156, 156 from being dislodged when they contact door riser jams 206, 208 as the door panel 140 is opened or close.

As shown in FIGS. 4–5, first and second door riser jams 206, 208 are attached to bulkhead wall portions 202 and 204, and are inclined toward the plane in which door 100 resides. Jam 206 has a modified wedge-shaped cross-section so that its left edge 306 is essentially flush with the surface of left-hand bulkhead wall portion 202, but its right edge 308 is raised a small distance (for example, 0.375 inches) from that surface to define a peak or ridge. The small raised distance is preferably selected to substantially exceed the thickness of any wall treatment material 304 which may be present. Right-hand jam 208 is similarly constructed having a flush left edge 310, and a raised right edge 312 defining a ridge.

The purpose of jams 206, 208 is to provide an interference surface against which door seal means 156, 158 may securely engage when the door 100 is in the closed position 162. Therefore, the dimensions of flanges 320 and bead 322, the location of upper door track 200, and the raised extension distances of the right edges 308, 312 of jams 206, 208 are preferably selected so that nubs 324, 326 clear any wall treatment material 304 which may be present, but tubular beads 322 will securely contact jams 206 and 208.

In operation, assuming the door 100 is in its open position 160 shown in FIG. 4, the user slides the door toward its closed position 162 shown in FIG. 5. Seal means 156, 158 are initially in their uncompressed states. As the door 100 approaches the closed position 162, each seal means 156, 158 reaches the left, flush edge 306, 310 of its corresponding jam As the door slides further toward the closed position 162, each seal means is compressed between door panel 140 and the inclined surface of the respective jam As the door reaches the fully closed position, nubs 324, 326 seat around the ridges defined by right-hand edges 308, 312 of jams 206, 208, resulting in a stable resting location for door 100. As shown most clearly in FIG. 5, when the door is in its fully closed position 162, the seals 156, 158 are substantially compressed. In the fully closed position, the seals 156, 158 in cooperation with the jams 206, 208 urge the door toward the front of the van and snugly against the upper and lower tracks 200, 230.

Due to the captive structures provided by upper and lower door tracks 200, 230, the door 100 may not move any substantial distance forward in order to relieve the force exerted by compressed seal means 156, 158. Accordingly, the door 100 constructed according to the present invention is held tightly in position to minimize rattles and other undesirable vibrations produced by movement of the vehicle. In addition, since a large portion of the interface between the bulkhead wall 102 and the inventive door 100 is now sealed, infiltration of noise, dust, and untreated air from the cargo section 120 into the passenger sections 130, 132 is now substantially reduced.

Thus, an internal door for a parcel van or similar vehicle has been disclosed which provides substantially vibration-an rattle-free operation when in its closed position. The door provides a seal to minimize air interchange between areas on either side of the door. The inventive door provides a locking mechanism which is free of protrusions into a passageway served by the door. The door is spaced from the adjacent bulkhead wall so that the inventive door may be used in situations where a relatively thick wall treatment material is applied to the wall.

The above-described embodiment of the invention is merely one example of a way in which the invention may be carried out. Other ways may also be possible, and are within the scope of the following claims defining the invention.

What is claimed is:

1. A vehicle door assembly comprising:
   a supporting wall, said wall having a passageway;
   a door panel disposed substantially parallel to said wall, said door panel being slidably mounted in spaced parallel relation to said wall for bilateral movement between an open position and a closed position;
   at least one seal means extending perpendicularly from said door panel toward said wall; and
   at least one jamb means extending from said wall toward said door panel for engaging said seal means, said jamb means having first and second vertical edges, said jamb means inclined between said edges in the direction of movement of said door panel.

2. A vehicle door assembly comprising:
   a supporting wall, said wall having a passageway with first and second vertical edges;
   a door panel mounted for translation in spaced relation to said wall, said door panel having a closed position in which said door substantially covers said passageway, said door panel also having first and second substantially vertical edges;
   first and second seal means attached to said first and second vertical edges, said seal means protruding toward said wall; and
   first and second jamb means disposed adjacent said first and second vertical edges of said passageway, respectively, said jamb means having a respectively engaging said first and second jamb means when said door is in said closed position.

3. A door assembly as in claim 2, said door assembly further comprising upper and lower track means for supporting said door panel and for restricting movement of said door panel to a substantially linear path, wherein said first and second seal means urge said door panel against said track means when said door is in said closed position.

4. A door assembly as in claim 2, said door assembly further comprising upper and lower track means for supporting said door panel and for restricting movement of said door panel to a substantially linear path, wherein said first and second seal means exert a force to substantially prevent movement of said door panel in a direction perpendicular to said linear path when said door is in said closed position.

5. The door assembly of claim 2 wherein said first and second seal means each comprise a resilient member mounted perpendicularly to said door panel.

6. The door assembly of claim 5 wherein said resilient members each include a flange extending toward said door panel for engagement therewith and a pair of seating nubs in spaced relation to one another and in approximate opposition to said flange.

7. The door assembly of claim 2 further comprising releasable retaining means attached to said door panel, said retaining means having a first protruding position and a second non-protruding position, and at least one stop means recessed from said passageway for engaging said retaining means to prevent translation of said door panel when said retaining means is in said protruding position.

8. The door assembly of claim 2 wherein at least one of said jamb means forms a ridge and wherein at least one of said seal means further comprises a pair of spaced nubs for straddling said ridge when said door is in said closed position.

9. A door assembly as in claim 8, said door assembly further comprising means for restricting movement of said door panel to a substantially linear path, wherein said ridge and said nubs cooperate to resist movement of said door panel along said linear path when said door is in said closed position.

10. A door assembly as in claim 2, said door assembly further comprising means for restricting movement of said door panel to a substantially linear path, wherein said first and second seal means and said jamb means cooperate to resist movement of said door panel along said linear path when said door is in said closed position.

* * * * *

UNITED STATES PATENT AND TRADEMARK OFFICE
CERTIFICATE OF CORRECTION

PATENT NO. : 5,069,497            Page 1 of 2

DATED : December 3, 1991

INVENTOR(S) : Clelland, William F.

It is certified that error appears in the above-identified patent and that said Letters Patent is hereby corrected as shown below:

| | |
|---|---|
| Column 1, line 5 | between the words "This" and "to" insert --invention relates-- |
| Column 1, line 16 | no break in paragraph |
| Column 1, line 19 | insert --.-- after "tion" |
| Column 1, line 24 | insert --.-- after "tion" |
| Column 1, line 31 | insert --.-- after "problems" |
| Column 2, line 10 | "With" should be --with-- |
| Column 2, line 20 | "ar" should be --are-- |
| Column 2, line 24 | between the words "have" and "wall" insert --a-- |
| Column 2, line 60 | delete --2-- |
| Column 3, line 14 | delete --19-- |
| Column 4, line 3 | delete --18-- |
| Column 4, line 41 | insert --.-- after "pearance" |
| Column 4, line 44 | insert --.-- after "plywood" |
| Column 4, line 44 | "146" should be --100-- |
| Column 5, line 12 | insert --.-- after "constructed" |
| Column 6, line 5 | no break in paragraph |
| Column 6, line 37 | "26" should be --326-- |
| Column 6, line 41 | "ar" should be --are-- |
| Column 6, line 50 | "Fig. A" should be --Fig. 4A-- |
| Column 7, line 28 | "jam" should be --jamb-- |
| Column 7, line 28 | insert --.-- after "jamb" |
| Column 7, line 31 | "jam" should be --jamb-- |
| Column 7, line 31 | insert --.-- after "jamb" |

UNITED STATES PATENT AND TRADEMARK OFFICE
CERTIFICATE OF CORRECTION

PATENT NO. : 5,069,497

DATED : December 3, 1991

INVENTOR(S) : Clelland, William F.

It is certified that error appears in the above-identified patent and that said Letters Patent is hereby corrected as shown below:

Column 7, line 56   "an" should be --and--

Column 8, line 32   after the word "a" insert --substantially wedge-shaped cross section, said first and second seal means--

Signed and Sealed this

First Day of June, 1993

Attest:

MICHAEL K. KIRK

Attesting Officer

Acting Commissioner of Patents and Trademarks